(12) United States Patent
Millea et al.

(10) Patent No.: US 6,672,538 B2
(45) Date of Patent: Jan. 6, 2004

(54) TRANSMISSION FOR A COAXIAL COUNTER ROTATING ROTOR SYSTEM

(75) Inventors: Vincent Francis Millea, Stratford, CT (US); Anthony George Chory, Trumbull, CT (US); Michelle Consolini, Media, PA (US); Ralph D. Costanzo, Monroe, CT (US); Jules G. Kish, Milford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 10/153,970

(22) Filed: May 23, 2002

(65) Prior Publication Data

US 2003/0218093 A1 Nov. 27, 2003

(51) Int. Cl.$^7$ ................................................ B64C 27/30
(52) U.S. Cl. ......................... 244/6; 244/12.3; 244/23 B
(58) Field of Search ............................. 244/17.23, 12.2, 244/12.3, 12.1, 23 C, 23 B; 416/120, 128, 124, 129, 98; 475/1

(56) References Cited

U.S. PATENT DOCUMENTS

| | | | | |
|---|---|---|---|---|
| 2,523,197 A | * | 9/1950 | Daland | |
| 2,552,864 A | * | 5/1951 | Piasecki | |
| 2,996,269 A | * | 8/1961 | Parry | |
| 3,129,608 A | * | 4/1964 | Watson | |
| 5,152,478 A | * | 10/1992 | Cycon et al. | |
| 5,572,910 A | | 11/1996 | Tomaselli et al. | |
| 5,873,545 A | * | 2/1999 | Kapin et al. | |
| 5,974,911 A | | 11/1999 | Pias et al. | |
| 6,170,778 B1 | * | 1/2001 | Cycon et al. | |
| 6,302,356 B1 | | 10/2001 | Hawkins | |

* cited by examiner

*Primary Examiner*—Tien Dinh
(74) *Attorney, Agent, or Firm*—Carlson, Gaskey & Olds

(57) ABSTRACT

A transmission system for a hybrid aircraft is driven by a plurality of driveshafts and drives a translational propulsion system. Each driveshaft is mounted to a pinion gear which mesh with an upper and lower counter-rotating gear. The upper and lower counter-rotating gears drive a respective upper and lower rotor shaft which powers a counter-rotating rotor system. A first angle is defined between a first and a second driveshaft while a second angle is defined between the second and a third driveshaft. The angle between the driveshafts are a whole number multiple of the formula: $\theta=(CP/R)*(180/\pi)$. By so angularly locating the driveshafts, proper meshing of the pinion gears and the upper and lower counter-rotating gears is assured and tolerances are less stringent as the support structure is effective designed around optimal location of the driveshafts for gear meshing rather than vice versa.

26 Claims, 5 Drawing Sheets

TRANSMISSION FOR A COAXIAL COUNTER ROTATING ROTOR SYSTEM

This invention was made with government support under Contract No.: M67854-99C-2081 awarded by the Department of the Army. The government therefore has certain rights in this invention.

BACKGROUND OF THE INVENTION

The present invention relates to a hybrid aircraft, and more particularly, to a transmission for a rotor system within a rotor duct of a hybrid unmanned aerial vehicle (UAV).

There is an increased emphasis on the use of UAVs for performing various activities in both civilian and military situations where the use of manned flight vehicles may not be appropriate. Such missions include surveillance, reconnaissance, target acquisition, target designation, data acquisition, communications relay, decoy, jamming, harassment, ordinance delivery, or supply.

A hybrid aircraft provides the hover and low-speed maneuverability of a helicopter with the high-speed forward flight and duration capabilities of a winged aircraft. Typically, hybrid aircraft include a helicopter control surface system which provides cyclic pitch, collective pitch and differential rotation to generate lift, pitch, roll, and yaw control when operating in a hover/low-speed environment. Additionally, the hybrid aircraft includes a conventional fixed wing aircraft control surface system such as aileron, elevator, rudder and flaps to provide control when operating in a high-speed environment. Hybrid aircraft also may include a separate translational propulsive system.

Powering the multiple propulsion systems of a hybrid aircraft requires a relatively complicated transmission which must transmit power to the rotor system and translational propulsive system. The transmission is further complicated as multiple powerplants are commonly provided to assure sufficient power requirements. Coupling multiple power plants to a transmission system requires that relatively tight manufacturing tolerances be maintained. Each powerplant must also be interconnected with all the propulsion systems such that a single powerplant can drive all the propulsion systems in the event of a powerplant failure. Providing such requirements is particularly difficult in a UAV application which is relatively small and therefore requires light weight components.

Accordingly, it is desirable to provide a transmission system for a hybrid aircraft which is lightweight and uncomplicated while transmitting power from a plurality of powerplants.

SUMMARY OF THE INVENTION

A coaxial transmission system for a hybrid aircraft according to the present invention is driven by a plurality of driveshafts and drives a translational propulsion system. Each driveshaft is mounted to a pinion gear which mesh with an upper and lower counter-rotating gear. The upper and lower counter-rotating gears drive a respective upper and lower rotor shaft which powers a counter-rotating rotor system.

An angle A is defined between the driveshaft that drives a translational propulsion system and the driveshafts which drive the transmission. An angle B is defined between the two driveshafts which drive the transmission. The angles A and B must be divisible by the angle θ as an integer. The angle θ is defined by the formula: θ=(CP/R)*(180/π).

By angularly locating the driveshafts according to the present invention, proper meshing of the pinion gears and the upper and lower counter-rotating gears is assured. Moreover, tolerances are less stringent as the support structure is effectively designed around the optimal location of the driveshafts for gear meshing rather than visa versa. As the multi-bladed counter-rotating rotors include four blades each, the number of driveshafts do not equal the number of blades to reduce harmonic disturbances.

The transmission system includes an upper and lower housing which have a hard chrome plated outer surface to provide a smooth and durable surface for operation of an upper and lower swashplate.

An electric generator is mounted parallel to at least one driveshaft and is driven thereby to generate electrical power for the vehicle.

The present invention therefore provides a transmission system for a hybrid aircraft which is lightweight and uncomplicated while transmitting power from a plurality of powerplants.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1A:
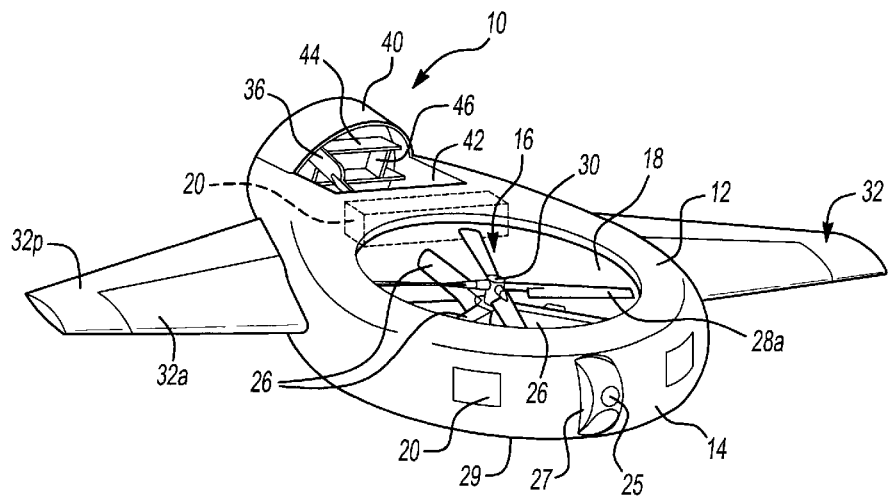
FIG. 1A is a general perspective view of a hybrid aircraft having a transmission system according to the present invention.

FIG. 1A illustrates a hybrid aircraft 10, such as the Unmanned Aerial Vehicle (UAV) developed by Sikorsky Aircraft Corporation. For further understanding of the UAV embodiment and associated components thereof, attention is directed to U.S. Pat. No. 6,170,778 entitled "Method of Reducing a Nose-Up Pitching Movement on a Ducted Unmanned Aerial Vehicle," which is assigned to the assignee of the instant invention and which is hereby incorporated herein in its entirety. It should be further understood that other hybrid aircraft will also benefit from the instant invention.

The aircraft 10 includes a body 12 with a toroidal portion 14 having a generally hemi-cylindrical aerodynamic profile. A rotor assembly 16 is mounted within a duct 18 that extends substantially vertically through the body 12.

Figure 1B:
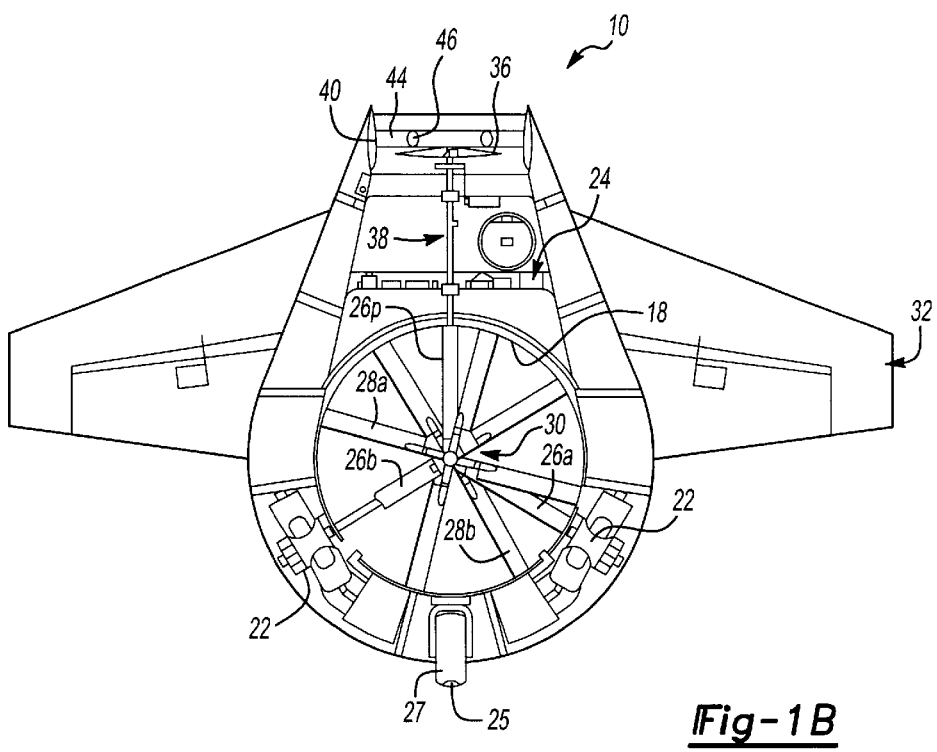
FIG. 1B is a top view of the hybrid aircraft of FIG. 1A.

The body 12 includes a plurality of internal bays 20 for housing and/or storing aircraft flight and mission components. The bays 20 house one or more powerplant subsystems 22 and a flight control system 24 (FIG. 1B) positioned within the bays to balance the aircraft about the center of the rotor assembly. The flight control system 24 generally includes flight computers, transmitters, receivers, navigation sensors and attitude sensors well known in the UAV field.

Mission related sensors 25, such as a camera system, forward looking infrared radar (FLIR) sensor, laser designator, thermal imager, communications, or the like are also preferably located in a turnable turret 27 in a forward area 29 of the vehicle 10. It should be understood that although a particular component arrangement is disclosed in the illustrated embodiment, other arrangements, replaceable mission packages, weapon systems and the like will benefit from the instant invention.

A plurality of struts 26A, 26B, 26P extend between the body and the rotor assembly 16 to support the rotor assembly 16 in a fixed co-axial relation with respect to the duct 18. The support struts 26A, 26B, 26P also provide structural rigidity to the aircraft duct 18 to prevent flight and ground loads from distorting the body 12. The support struts 26 are hollow structures that can be used as conduits for interconnecting operating elements of the UAV 10.

Figure 4:
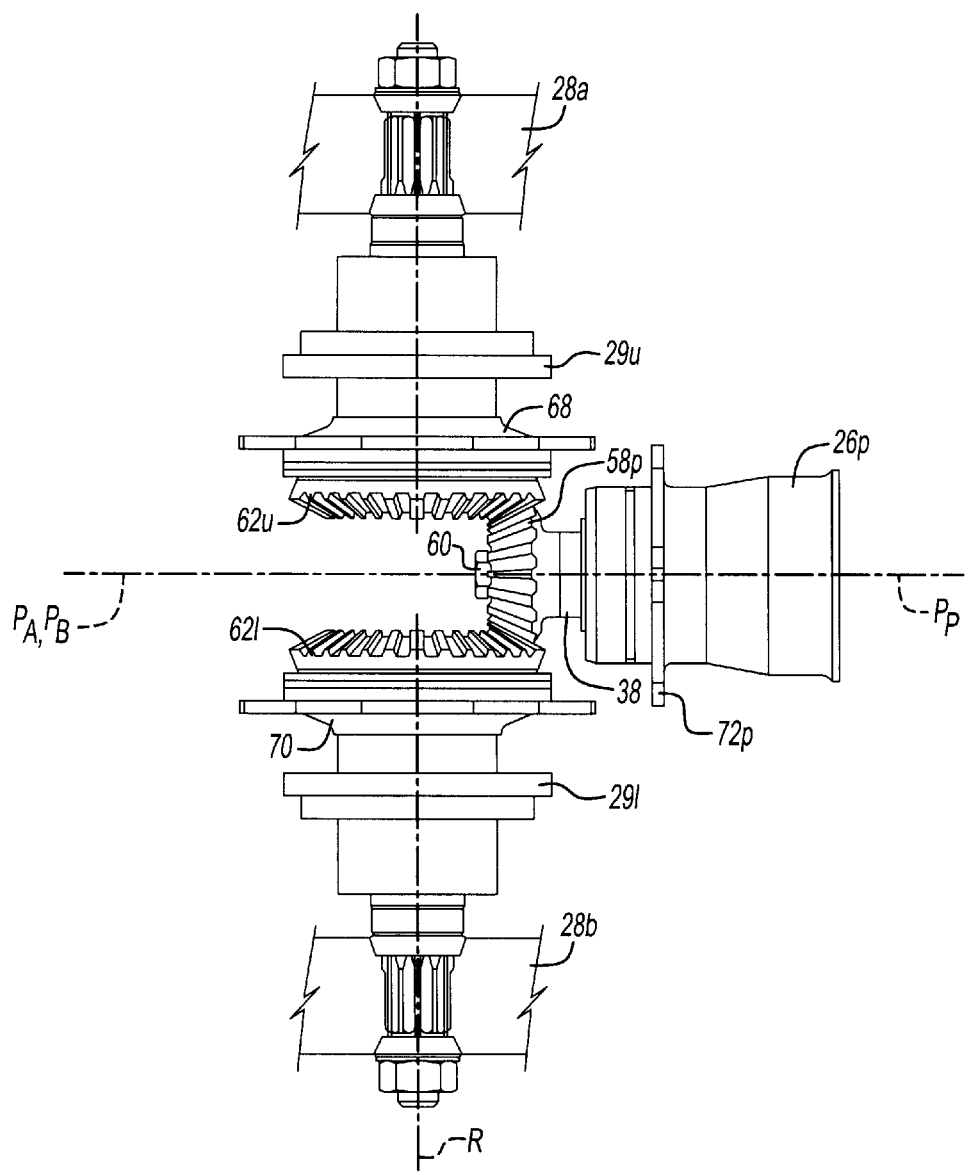
FIG. 4 is a partial view along aircraft and view of the gear arrangement within the transmission system.

The rotor assembly 16 includes a pair of multi-bladed, counter-rotating rotors 28a, 28b, coaxially aligned with the duct 18, and a coaxial transmission system therebetween (illustrated somewhat schematically at 30). Each counter-rotating rotor 28a, 28b preferably includes a plurality of blade assemblies in which blade pitch changes induced in the counter-rotating rotor systems 28a, 28b, i.e., cyclic and/or collective pitch inputs, can be utilized to generate lift, pitch, yaw, and roll control of the aircraft 10. Control is preferably provided by cyclic and collective movement of the multi-bladed, counter-rotating rotors 28a, 28b through upper and lower swashplates (illustrated schematically at 29u, 29l; FIG. 4).

Wings 32 extend laterally outward from the aircraft body 12 to provide high lifting forces and a large nose-down pitching moment in forward translational flight. Those skilled in the art would readily appreciate the diverse wing and non-wing arrangements that can be incorporated into a UAV according to the present invention. Preferably, each wing 32 includes a fixed stub portion 32F and a pivotal flight control surface portion 32P such as a flaperon or aileron.

To provide translational thrust, the aircraft 10 includes a pusher prop 36 mounted to a rear portion of the vehicle 10. The prop 36 is mounted to a drive shaft 38 which is driven by the transmission 30. The drive shaft 38 preferably extends with a support strut 26P. The prop 36 is preferably mounted to the rear of the aircraft with its rotational axis oriented substantially horizontal.

A prop shroud 40 is formed on the aft body 42 and around the pusher prop 36. The cross-sectional shape of the shroud 40 is preferably configured as an airfoil to provide the shroud 40 with a lift component. Mounted on the shroud 40 aft of the pusher prop 36 are one or more horizontal and vertical control surfaces 44,46. Preferably, the control surfaces 44,46 are pivotally mounted to the shroud 40 to permit the exhausted air to be channeled in a controllable manner such that the horizontal control surfaces 44 function as elevators and the vertical control surfaces 46 function as rudders.

Figure 2A:
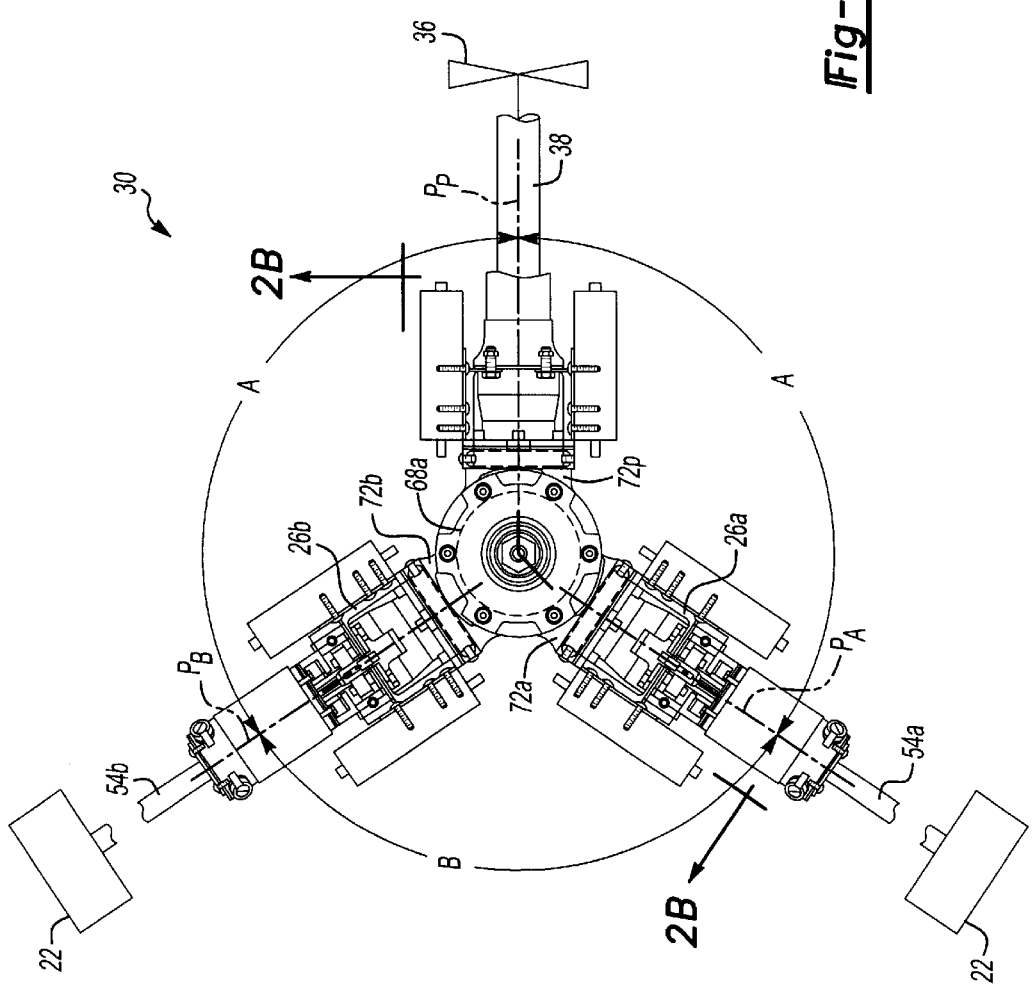
FIG. 2A is a top view of a transmission for a hybrid aircraft designed according to the present invention.

Referring to FIG. 2A, a top view of the coaxial transmission system 30 is illustrated. The drive shaft 38 is mounted along an axis of rotation Pp to drive the pusher prop 36 through one of the support struts 26. Axis of rotation Pp is preferably defined along the axial centerline of the vehicle 10 to drive the pusher prop 36 mounted to the rear portion of the vehicle 10. Driveshafts 54A, 54B are mounted along a respective axis of rotation Pa, Pb. The driveshafts 54A, 54B extend through a respective support strut 26A, 26B to transfer power developed by the powerplant 22 (FIG. 1B) to the coaxial transmission 30.

Figure 2B:
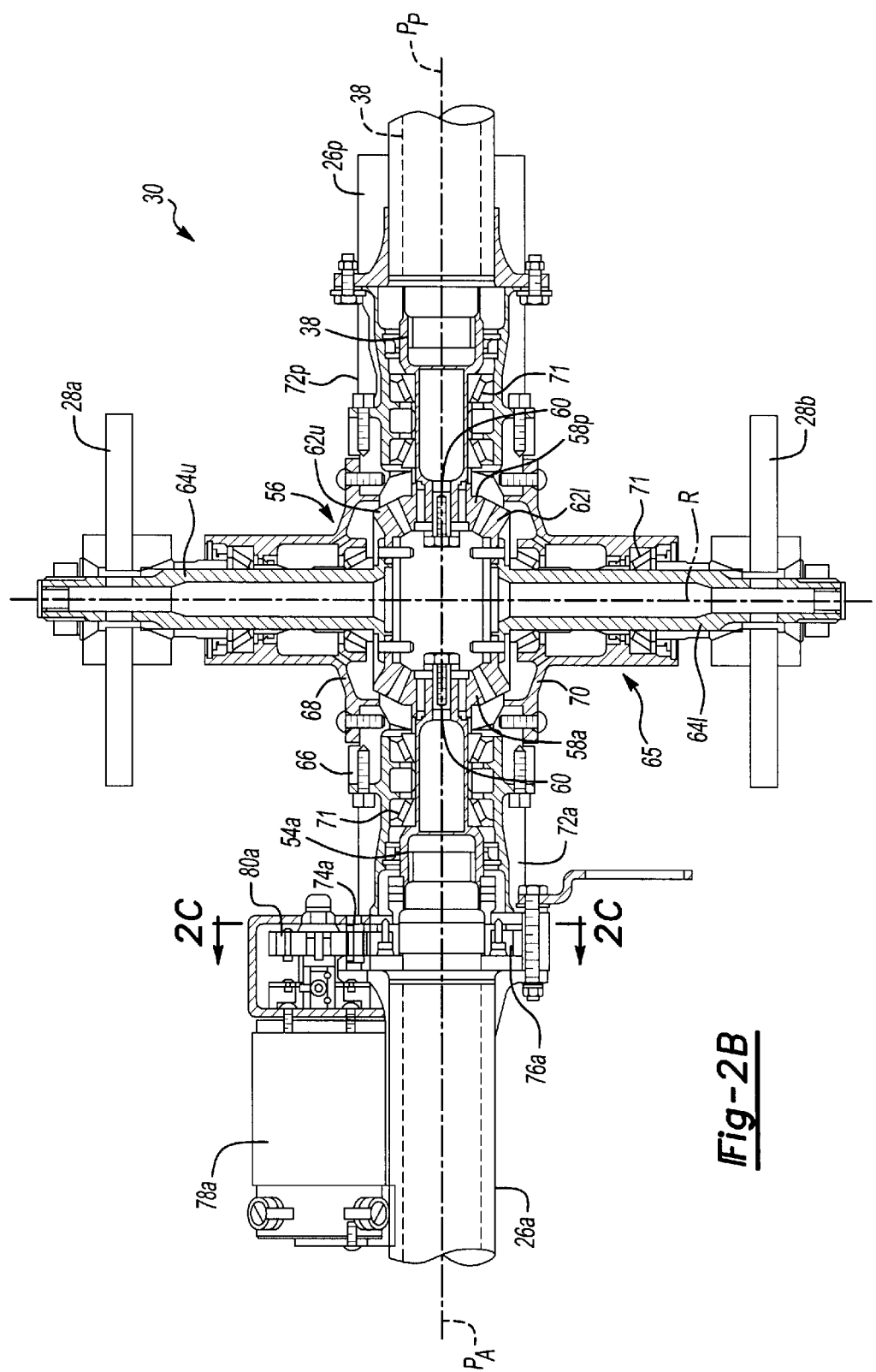
FIG. 2B is an expanded side view of the transmission of FIG. 2A taken along the line 2B—2B.

Referring to FIG. 2B, a sectional view of the transmission system 30 is illustrated showing the transmission gear set 56. Each driveshafts 54A, 54B, and 38 are mounted to a pinion gear 58A, 58B, and 58P through a threaded fastener 60 or the like. The pinion gears 58A, 58B, and 58P are mounted between and mesh with an upper and lower counter-rotating gear 62u, 62l (also illustrated in FIG. 4). The upper and lower counter-rotating gear 62u, 62l are preferably located in a plane parallel to the counter-rotating rotor systems 28a, 28b. The upper and lower counter-rotating gear 62u, 62l drive a respective upper and lower rotor shaft 64u, 64l which rotates the counter-rotating rotor systems 28a, 28b about an axis R.

Input power is transmitted from the powerplants 22 through the driveshafts 54A, 54B to the upper and lower counter-rotating gear 62u, 62l and the drive shaft 38. Preferably, a 2:1 reduction ratio between the pinion gear 58A, 58B, and 58P and the upper and lower counter-rotating gear 62u, 62l. In one example, the gear set 56 includes pinion gears 58A, 58B, and 58P having 16 teeth each and upper and lower counter-rotating gear 62u, 62l having 32 teeth each being driven at 7750 RPM and 27 horsepower. It should be understood that other ratios and gear sets will also benefit from the present invention.

Preferably, an angle A is defined between the axis of rotation Pp and the axis of rotation Pa, Pb while an angle B is defined between and the axis of rotation Pa and the axis of rotation Pb (FIG. 2A). Preferably, angle B is not equal to angle A. In the above described example, angle A is 123 degrees 45 minutes and angle B is 112 degrees 30 minutes. It should be understood that other gear sets will require other angles. Moreover, as the multi-bladed counter-rotating rotors 28a, 28b include four blades each, it is preferred that the number of driveshafts 38, 54A, 54B not be equal to the number of blades so as to minimize harmonic disturbances.

Figure 3A:
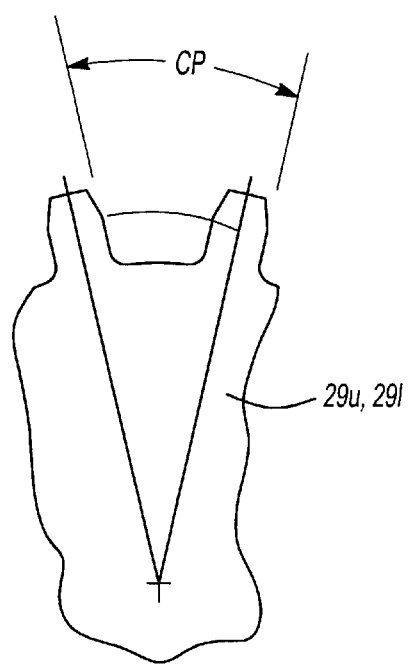
FIG. 3A is a schematic representation of an arc length (circular pitch) between two teeth.
Figure 3B:
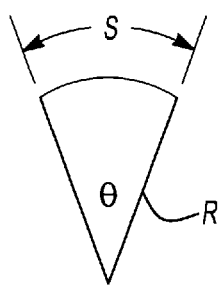
FIG. 3B is a geometric representation of a circular pitch.

Generally, the desired angles can be defined by the following formulas:

$$CP = \pi/n = \pi d/(n/d) = \pi/P;$$

and $$S = R\theta = CP$$

Where CP is the circular pitch between the driving faces of two teeth of the upper and lower counter-rotating gear 62u, 62l (FIG. 3A). That is, the circular distance S (FIG. 3B) is equal to the radial distance R times the angle $\theta$.

Thus, $\theta = (CP/R) * (180/\pi)$

Where multiplying by $(180/\pi)$ converts radians into degrees. In one configuration consistent with the UAV developed by Sikorsky Aircraft Corporation $CP = \pi/10 = 0.31415$ and $R = 3.2/2$. Thus, $\theta = 11.25$ degrees and any driveshaft input angle must be divisible by an integer to obtain 11.25 degrees. The following angles are consistent with the exemplary configuration: 90.00; 101.25; 112.50; 123.75; and 135.00, however, it should be understood that other configurations will require other angles consistent with the present invention.

By angularly locating the driveshafts 54A, 54B, and 38 and surrounding struts 26A, 26B and 26P according to the present invention, proper meshing of the pinion gears 58A, 58B, and 58P and the upper and lower counter-rotating gears 62u, 62l is assured. Moreover, tolerances are less stringent as the support structure is effectively designed around the optimal location of the driveshafts, 54A, 54B, and 38 for gear meshing rather than visa versa. Preferably, as the multi-bladed counter-rotating rotors 28a, 28b include four blades each, it is preferred that the number of driveshafts 38, 54A, 54B not be equal to the number of blades so as to prevent harmonic disturbances.

The transmission system 30 includes a housing 65 manufactured of a multiple of portions: a center hub 66; an upper housing 68; a lower housing 70, and three pinion housings 72A, 72B, and 72P. The outer surface of the upper and lower housings 68, 70 are preferably hard chrome plated to provide a smooth and durable surface for operation of the upper and lower swashplates (illustrated schematically at 29u, 29l in FIG. 4).

A plurality of bearings 71 support the various shafts 54A, 54B, 38, 64u and 64l within the housing 65. Preferably, the shafts and housing are designed such that bearings 71 of a single size are used within the transmission system 30 to thereby minimize maintenance and logistic considerations. It should be understood, however, that the present invention is not to be limited to a transmission having but a single bearing size.

Figure 2C:
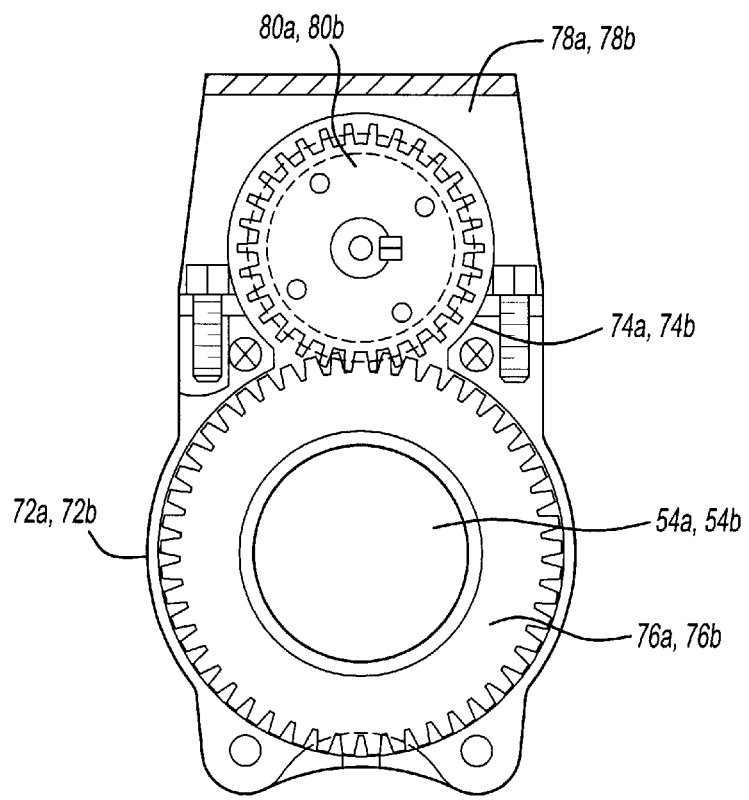
FIG. 2C is an expanded sectional view of FIG. 2B taken along the line 2C—2C of a transmission for a hybrid aircraft designed according to the present invention.

Referring to FIG. 2C, the pinion housings 72A, 72B define an opening 74A, 74B spaced axially from the upper and lower housings 68, 70. A shaft gear 76A, 76B is mounted to the driveshafts 54A, 54B for rotation therewith. An electric generator 78A, 78B is preferably mounted parallel to the driveshafts 54A, 54B such that a generator gear 80A, 80B meshes with the shaft gear 76A, 76B through openings 74A, 74B respectively. The shaft gears 76A, 76B are preferably manufactured of a non-metallic material to avoid generation of electrical noise. The electric generator 78A, 78B are driven by the driveshafts 54A, 54B to generate electrical power for the vehicle 10.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A transmission system for a hybrid aircraft having a rotor duct comprising:
   a transmission mounted within the rotor duct;
   a first driveshaft rotatable about a first axis, said first driveshaft rotationally engaged with said transmission;
   a second driveshaft rotatable about a second axis, said second driveshaft rotationally engaged with said transmission, said first axis and said second axis defining a first angle divisible by a constant value related to a circular pitch of a gear within said transmission; and
   a third driveshaft rotatable about a third axis, said third driveshaft rotationally engaged with said transmission, said third axis and said second axis defining a second angle divisible by said constant value.

2. The transmission system as recited in claim 1, wherein said constant value is defined by the formula $\theta=(CP/R)*(180/\pi)$.

3. The transmission system as recited in claim 1, wherein said first angle is different than said second angle.

4. The transmission system as recited in claim 1, wherein said first driveshaft is driven by said transmission and said second and third driveshaft drive said transmission.

5. The transmission system as recited in claim 1, wherein said first driveshaft, said second driveshaft, and said third driveshaft are each mounted within a support strut which support said transmission.

6. The transmission system as recited in claim 1, wherein said transmission comprises a counter-rotating transmission driving a rotor system.

7. The transmission system as recited in claim 1, wherein said transmission comprises an upper and a lower housing for respectively movably mounting an upper and a lower swashplate.

8. The transmission system as recited in claim 7, wherein said upper and lower housing comprise a hardened chrome outer surface for movably mounting said upper and lower swashplate.

9. The transmission system as recited in claim 1, further comprising an electric generator mounted parallel to said second driveshaft, said electric generator being driven thereby.

10. A hybrid aircraft comprising:
    a body comprising a toroidal portion and a rotor duct;
    a transmission mounted within said rotor duct;
    a first driveshaft rotatable about a first axis, said first driveshaft rotationally engaged with said transmission;
    a second driveshaft rotatable about a second axis, said second driveshaft rotationally engaged with said transmission, said first axis and said second axis defining a first angle divisible by a constant value related to a circular pitch of a gear within said transmission; and
    a third driveshaft rotatable about a third axis, said third driveshaft rotationally engaged with said transmission, said third axis and said second axis defining a second angle divisible by said constant value.

11. The hybrid aircraft as recited in claim 10, further comprising a counter-rotating rotor assembly driven by said transmission, said counter-rotating rotor assembly comprising a number of blades unequal to a number of said driveshafts.

12. The hybrid aircraft as recited in claim 10, further comprising a translational propulsion system driven by said transmission.

13. The hybrid aircraft as recited in claim 10, further comprising a wing extending from said body.

14. The hybrid aircraft as recited in claim 10, wherein said constant value is defined by the formula $\theta=(CP/R)*(180/\pi)$.

15. The hybrid aircraft as recited in claim 10, wherein said first angle is different than said second angle.

16. The hybrid aircraft as recited in claim 10, wherein said first driveshaft is driven by said transmission and said second and third driveshaft drive said transmission.

17. The hybrid aircraft as recited in claim 10, wherein said first driveshaft, said second driveshaft, and said third driveshaft are each mounted within a support strut which support said transmission.

18. A hybrid aircraft comprising:
    a body comprising a toroidal portion and a rotor duct;
    a transmission mounted within said rotor duct;
    a plurality of support struts mounted to said rotor duct and said transmission, said plurality of support struts located in a non-equidistant angular relationship divisible by a constant value related to a circular pitch of a gear within said transmission.

19. The hybrid aircraft as recited in claim 18, further comprising a counter-rotating rotor assembly driven by said transmission, said counter-rotating rotor assembly comprising a number of blades unequal to a number of said plurality of support struts.

20. The hybrid aircraft as recited in claim 18, wherein said plurality of support struts comprise a first and a second support strut which define an angle therebetween, said angle defined by the formula $\theta=(CP/R)*(180/\pi)$.

21. The transmission system as recited in claim 1, wherein said first driveshaft, said second driveshaft and said third driveshaft are located in a non-equidistant angular relationship.

22. The hybrid aircraft as recited in claim 10 wherein said first driveshaft, said second driveshaft and said third driveshaft are located in a non-equidistant angular relationship.

23. The transmission system as recited in claim 1, wherein said circular pitch is determined between a driving face of two teeth in an upper and a lower counter-rotating gear within said transmission.

24. The hybrid aircraft as recited in claim 10, wherein said circular pitch is determined between a driving face of two teeth in an upper and a lower counter-rotating gear within said transmission.

25. The hybrid aircraft as recited in claim 18, wherein said circular pitch is determined between a driving face of two teeth in an upper and a lower counter-rotating gear within said transmission.

26. The hybrid aircraft as recited in claim 18, wherein said plurality of support struts comprise a first a second and a third support strut, said first and said second support strut defining a first angle divisible by said constant value and said third and said second support strut defining a second angle divisible by said constant value, said first angle different than said second angle.

* * * * *